United States Patent
Miyajima et al.

(10) Patent No.: US 7,710,285 B2
(45) Date of Patent: May 4, 2010

(54) BATTERY DEVICE AND ELECTRONIC APPARATUS

(75) Inventors: Yoichi Miyajima, Tokyo (JP); Toshio Takeshita, Kanagawa (JP); Kei Tashiro, Kanagawa (JP); Osamu Nagashima, Tokyo (JP); Masatsugu Honma, Kanagawa (JP)

(73) Assignee: Sony Corporation, Tokyo (JP)

( * ) Notice: Subject to any disclaimer, the term of this patent is extended or adjusted under 35 U.S.C. 154(b) by 330 days.

(21) Appl. No.: 11/880,975

(22) Filed: Jul. 25, 2007

(65) Prior Publication Data

US 2008/0048876 A1    Feb. 28, 2008

(30) Foreign Application Priority Data

Jul. 27, 2006    (JP)    ............................. 2006-204518

(51) Int. Cl.
      *H04N 3/24* (2006.01)
(52) U.S. Cl. .................. 340/636.1; 340/572.8; 320/106
(58) Field of Classification Search .............. 340/636.1,
      340/636.11, 636.12, 636.15, 636.19, 572.1,
      340/572.4, 572.8, 539.1; 455/41.2, 41.3,
      455/575.7; 320/106, 110
      See application file for complete search history.

(56) References Cited

U.S. PATENT DOCUMENTS

| 7,181,164 | B2 * | 2/2007 | Lee et al. .................. 455/41.2 |
| 7,352,152 | B2 * | 4/2008 | Kawaguchi et al. ......... 320/106 |
| 2006/0261960 | A1 * | 11/2006 | Haraguchi et al. ....... 340/572.8 |

FOREIGN PATENT DOCUMENTS

| JP | 6 189461 | 7/1994 |
| JP | 2005 345369 | 12/2005 |

* cited by examiner

*Primary Examiner*—Van T. Trieu
(74) *Attorney, Agent, or Firm*—Frommer Lawrence & Haug LLP; William S. Frommer; Thomas F. Presson

(57) ABSTRACT

A battery device includes a battery cell, a case housing the battery cell, an antenna, a battery-side communication unit performing wireless communication with an electronic-apparatus side communication unit provided at an electronic apparatus on which the battery device is removably mounted through the antenna, a memory unit storing battery data which is data concerning the battery device and a control unit performing control of the battery-side communication unit, both reading/writing of the battery data with respect to the memory unit or only reading thereof.

11 Claims, 12 Drawing Sheets

BATTERY DEVICE AND ELECTRONIC APPARATUS

CROSS REFERENCES TO RELATED APPLICATIONS

The present invention contains subject matter related to Japanese Patent Application JP 2006-204518 filed in the Japanese Patent Office on Jul. 27, 2006, the entire contents of which being incorporated herein by reference.

BACKGROUND OF THE INVENTION

1. Field of the Invention

The invention relates to a battery device and an electronic apparatus on which the battery device is mounted.

2. Description of the Related Art

In electronic apparatuses such as a digital still camera and a video camera, a battery device (battery pack) is used as a power supply.

Recently, a battery device is proposed, in which a communication unit performing communication with respect to the electronic apparatus is provided and data concerning the battery device mounted on the electronic apparatus, for example, battery remaining amount data is transmitted to the electronic device by the communication unit (refer to JP-A-2005-345369 (Patent Document 1)). In the battery device, a communication path for transmitting data by electrically connecting a data communication terminal at the battery side provided at the battery device and a data communication terminal at the electronic apparatus side provided at the electronic apparatus.

In such electronic apparatus, an icon or an indicator indicating a battery remaining amount is displayed on a display based on the received battery remaining amount data.

Additionally, a battery device is proposed, in which a display including a LED and the like is provided at a case of the battery device and a battery remaining amount is displayed on the display (refer to JP-A-6-189461 (Patent Document 2)).

SUMMARY OF THE INVENTION

When using the above electronic apparatus, it is often the case that an auxiliary battery is carried in addition to the battery device mounted on the electronic apparatus, and it will be necessary to check a remaining amount of the auxiliary battery device.

In such case, in the former battery device, every time the remaining amount of the auxiliary battery device is checked, it is necessary that the battery device mounted on the electronic apparatus is removed once and that the auxiliary battery device is mounted on the electronic apparatus to allow the remaining amount to be displayed on the display, then, it is necessary that the auxiliary battery device is removed and the original battery device is mounted, therefore, the operation is troublesome.

On the other hand, in the latter battery device, a space to be occupied by a display is necessary inside the battery device, therefore, there is a problem that it is difficult to increase battery capacity while aiming to reduce the size of the battery device.

It is desirable to provide a battery device and electronic apparatus which are capable of acquiring data concerning the battery device by the electronic apparatus easily without mounting the battery device on the electronic apparatus as well as which are advantageous to reducing the size of the battery device and to increase the battery capacity.

According to an embodiment of the invention, there is provided a battery device including a battery cell, a case housing the battery cell, an antenna, a battery-side communication unit performing wireless communication through the antenna with respect to an electronic-apparatus side communication unit provided at the electronic apparatus on which the battery device is removably mounted, a memory unit storing battery data which is data concerning the battery device and a control unit performing control of the battery-side communication unit, and both reading and writing the battery data with respect to the memory unit or only reading thereof.

Also according to an embodiment of the invention, there is provided an electronic apparatus on which the battery device is removably mounted, which has an electronic apparatus-side communication unit performing wireless communication with the battery-side communication unit provided at the battery device in a state in which the battery device is not mounted on the electronic apparatus, in which the wireless communication performed between the electronic-apparatus side communication unit and the battery-side communication unit includes reception of battery data which is data concerning the battery device from the battery-side communication unit.

Also according to an embodiment of the invention, there is provided electronic apparatus on which the battery device is removably mounted, which has an electronic-apparatus side communication unit performing wireless communication with the battery-side communication unit provided at the battery device which will be used next in a state in which the battery device is mounted on the electronic apparatus, in which wireless communication performed between the electronic-apparatus side communication unit and the battery-side communication unit includes reception of battery data which is data concerning the battery device which will be used next from the battery-side communication unit.

According to the battery device and the electronic apparatus of an embodiment of the invention, battery data of an auxiliary battery device which will be used next such as remaining amount data can be easily acquired by the electronic apparatus without mounting the auxiliary battery device on the electronic apparatus, therefore, it is advantageous to improve usability.

Additionally, since it is not necessary to provide a display for displaying battery data at the battery device, it is advantageous to increase battery capacity while aiming to reduce the size of the battery device.

DESCRIPTION OF THE PREFERRED EMBODIMENTS

First Embodiment

Hereinafter, an electronic apparatus 10 and a battery device 30 according to an embodiment of the invention will be explained with reference to the drawings.

Figure 1:
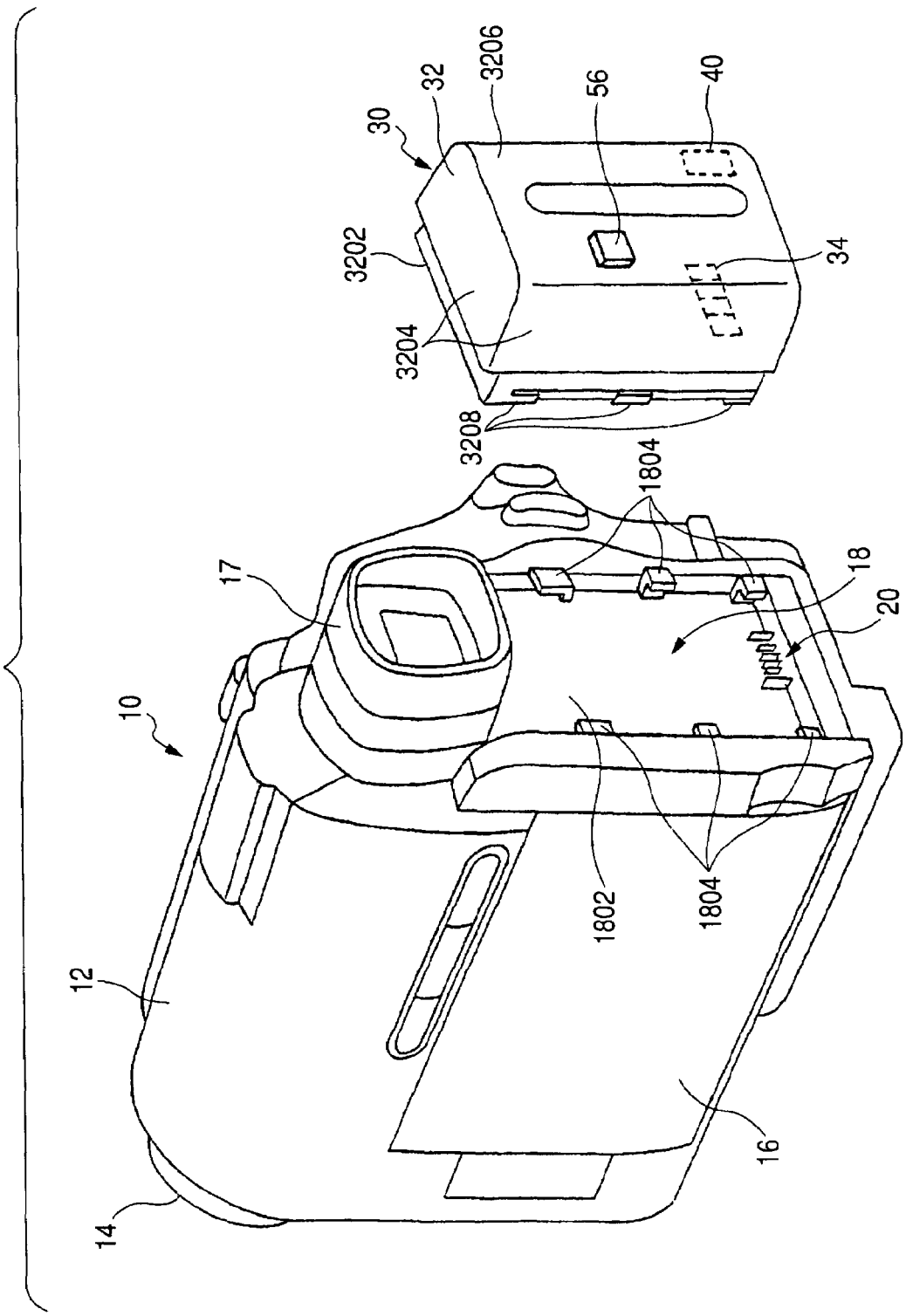
FIG. 1 are perspective views showing an electronic apparatus 10 and a battery device 30.
Figure 2:
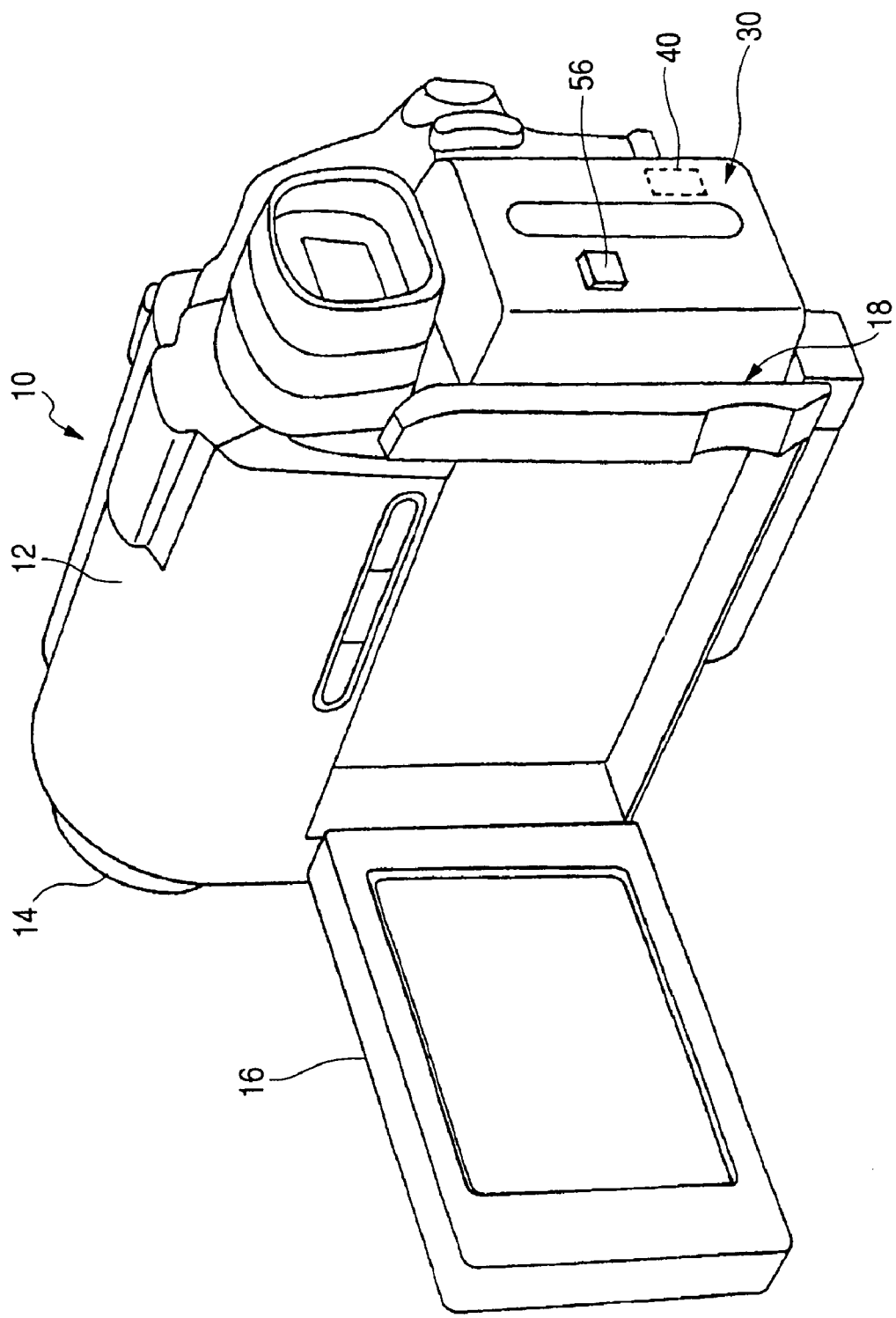
FIG. 2 is an explanatory view showing a state in which the battery device 30 is mounted on the electronic apparatus 10.

FIG. 1 are perspective views of the electronic apparatus 10 and the battery device 30, and FIG. 2 is an explanatory view showing a state in which the battery device 30 is mounted on the electronic apparatus 10.

In the embodiment, the electronic apparatus 10 is an imaging apparatus including a video camera.

The electronic apparatus 10 includes a case 12, an optical system 14 incorporated at the front of the case 12, a not-shown imaging device imaging subject pictures captured at the optical system 14, a display 16 displaying pictures imaged by the imaging device and a not-shown recording/playback unit recording pictures imaged by the imaging device in a recording medium and playing them back from the recording medium. The display 16 includes, for example, a liquid crystal display.

A viewfinder device 17 is provided at an upper rear part of the case 12, and a battery mount portion 18 is provided at a lower part of the viewfinder device 17.

The battery mount portion 18 is the portion on which the battery device 30 supplying power to the imaging device, the display 16, the recording/playback unit and the like is removably mounted.

The battery mount portion 18 includes a flat mounting surface 1802, a plurality of locking claws 1804 provided at the mounting surface 1802 and an apparatus-side terminal 20.

The plural numbers of locking claws 1804 are provided at both sides of the width direction of the mounting surface 1802.

As shown in FIG. 1, the battery device 30 includes a case 32, and the case 32 includes a bottom surface 3202 having a rectangular shape, four side surfaces 3204 connected to four edges of the bottom surface 3202 and an upper surface 3206 connecting the side surfaces 3204, which shows a rectangular parallelepiped shape.

A battery-side terminal 34 to be connected to the apparatus-side terminal 20 is provided at a point closed to one of two short edges of the bottom surface 3202.

At two side surfaces 3204 connected to two long edges of the bottom surface 3202, a plurality of locking pieces 3208 which can be locked at the locking claws 1804 are provided.

When allowing the battery-side terminal 34 of the battery device 30 to face the apparatus-side terminal 20 and allowing the battery device 30 to abut on the mounting surface 1802 to be slid downward, respective locking pieces 3208 of the battery device 30 are engaged with respective locking claws 1804, as a result, the battery device 30 is mounted on the battery mount portion 18 as shown in FIG. 2.

Accordingly, the battery-side terminal 34 and the apparatus-side terminal 20 are connected by the battery device 30 being mounted on the battery mount portion 18.

At the upper surface 3206, a battery-side operation switch 56 which will be described later is provided.

Next, the battery device 30 will be explained in detail.

Figure 3:
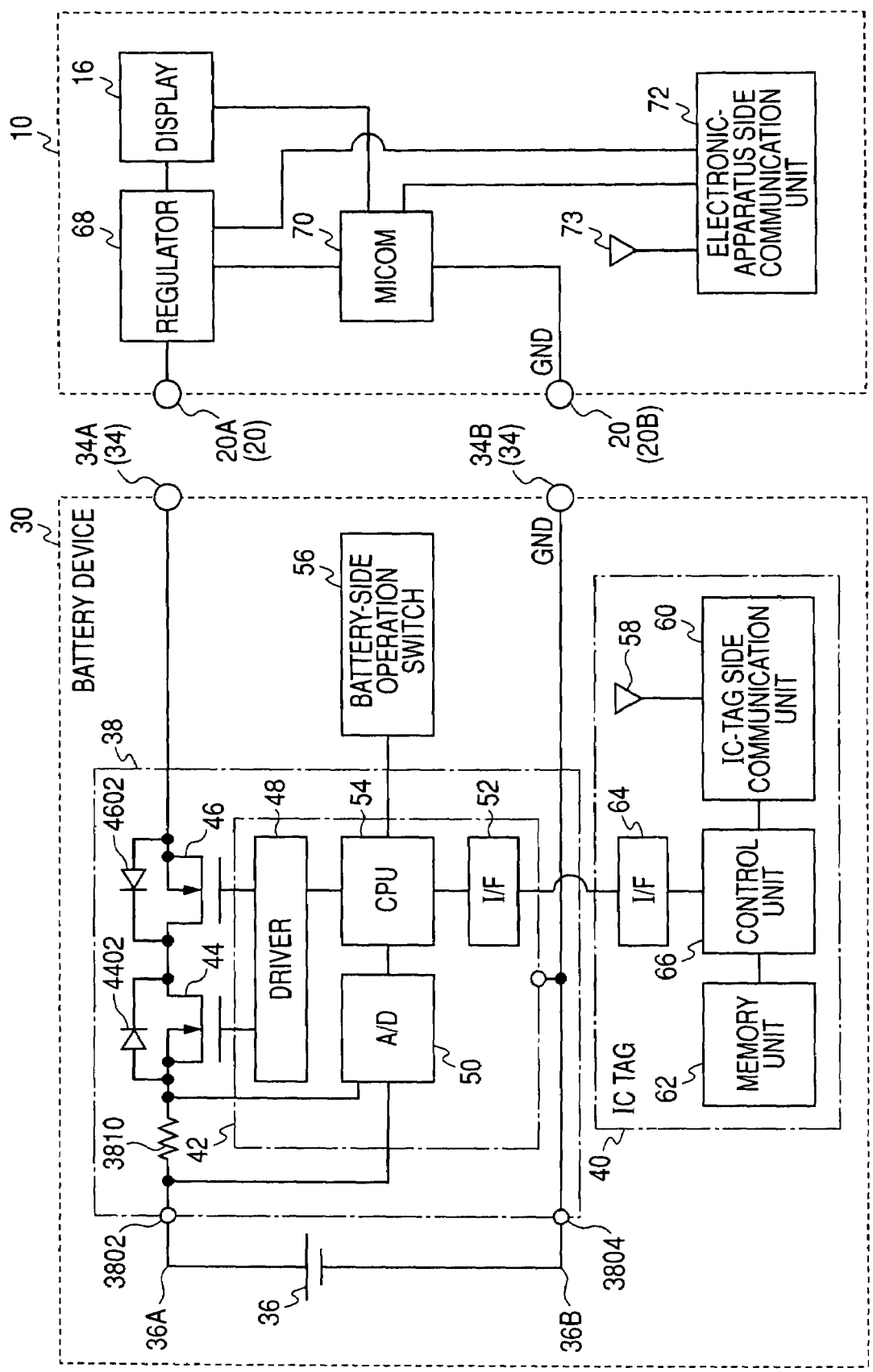
FIG. 3 is a block diagram showing configurations of the electronic apparatus 10 and the battery device 30 in a first embodiment.

FIG. 3 is a block diagram showing configurations of the electronic apparatus 10 and the battery device 30 in the first embodiment.

The battery device 30 includes a battery cell 36 and a control board (not shown) in which a battery control unit 38 and an IC tag 40 are provided, and the battery cell 36 and the control board are housed in the case 32.

The battery cell 36 includes a secondary battery, which is a lithium ion battery having a rectangular plate shape in the embodiment. As the secondary battery, optional one can be applied such as a nickel-cadmium battery, a nickel-hydrogen battery and the like.

A positive cell terminal 36A and a negative cell terminal 36B are provided at the battery cell 36.

The battery control unit 38 includes a microcomputer 42, a charge FET 44 and a discharge FET 46, which prevents overcharge or overdischarge of the battery cell 36, thereby having a function of protecting the battery cell 36 and being designed so as to correspond to individual electrical characteristic (specification) of the battery cell 36.

The positive cell terminal 36A of the battery cell 36 is electrically connected to a positive terminal 34A included in the battery-side terminal 34 through a terminal 3802, a charge FET 44 and a discharge FET 46 connected in series as well as connected to the microcomputer 42.

The negative cell terminal 36B of the battery cell 36 is electrically connected to a negative terminal 34B included in the battery-side terminal 34 through the terminal 3804 as well as connected to the microcomputer 42.

Explaining the above in detail, the cell terminal 36A is connected to a source of the charge FET 44 through the terminal 3802 and a detection resistance 3810 of several dozen mΩ of the battery control unit 38, a drain of the charge FET 44 is connected to a source of the discharge FET 46 and a drain of the discharge FET 46 is connected to the positive terminal 34A.

A body diode (additional diode) 4402 is formed between the source and the drain of the charge FET 44, and a body diode (additional diode) 4602 is also formed between the source and the drain of the discharge FET 46.

A drive signal supplied from a driver 48 of the battery control unit 38 which will be described later is given to a gate of the charge FET 44 and a gate of the discharge FET 46, accordingly, on/off operation of the charge FET 44 and the discharge FET 46 is controlled.

The charge FET 44 and the discharge FET 46 form a switch unit which turned on and off the electrical connection between the battery cell 36 and the positive terminal 34A. The switch unit is not limited to the FET as long as it has a function of turning on and off the electrical connection between the battery cell 36 and the positive terminal 34A.

The microcomputer 42 includes the driver 48, an A/D converter 50, an interface 52, a CPU 54 and the like.

The driver 48 supplies a drive signal to the gates of the charge FET 44 and the discharge FET 46 by control of the CPU 54.

The A/D converter 50 supplies a potential difference value E to the CPU 54, which corresponds to current supplied from the battery cell 36 or current supplied to the battery cell 36 by measuring potential difference between both ends of the detection resistance 3810, and the potential difference value E is converted into detection current of the battery cell 36 at the CPU 54.

The interface 52 is an interface used when performing communication bidirectionally with respect to the IC tag 40.

The CPU 54 operates by executing programs stored in a not-shown ROM, which controls the driver 48, the A/D converter 50, the interface 52, and which operates by direct-current power supply supplied through the cell terminals 36A and 36B of the battery cell 36.

The CPU 54 monitors detection current of the battery cell 36 detected by the A/D converter 50, which prevents overcharge to the battery cell 36 by turning off the charge FET 44 according to a value of the detection current at the time of charging, which prevents overdischarge of the battery cell 36 by turning off the discharge FET 46 according to a value of the detection current at the time of discharging, and which prevents overcurrent of the positive terminal 34A and the negative terminal 34B at the time of short-circuit.

The CPU 54 detects a battery remaining amount of the battery cell 36 based on the detection current of the battery cell 36 and supplies remaining amount data to the IC tag 40 through the interface 52.

In the embodiment, the CPU 54 detects the battery remaining amount by integrating detection current at the time of charging and at the time of discharging.

Therefore, in the embodiment, the detection resistance 3810, the A/D converter 50 and the CPU 54 form a remaining amount detection unit.

The method of detecting the battery remaining amount is not limited to the method of calculating by integrating current, and well-known various methods such as a method of calculating based on voltage of the battery cell 36 can be applied, however, it is advantageous to calculate the battery remaining amount more accurately by applying the method of the embodiment.

The CPU 54 detects whether the battery-side operation switch 56 was operated or not, and supplies control instructions to the IC tag 40, which instructs the communication start to an electronic-apparatus side communication unit 72 when the operation was performed.

The IC tag 40 is also called as a wireless IC tag or RFID (Radio Frequency Identification), which transmits or receives data to and from reader/writer through electromagnetic wave or electric wave with no-contact. Frequency bands of electromagnetic wave or electric wave used by the IC tag 40 in the wireless communication are variously prescribed by International Organization for Standardization, however, it is not particularly limited in the embodiment of the invention.

The IC tag 40 includes an antenna 58, an IC-tag side communication unit 60, a memory unit 62, an interface 64, a control unit 66 and the like.

The IC-tag side communication unit 60, performs wireless communication with respect to the electronic-apparatus side communication unit 72 of the electronic apparatus 10 through the antenna 58, which form a battery-side communication unit.

The memory unit 62 stores battery data which is data concerning the battery device 30, which includes a nonvolatile memory which can read and write in the embodiment.

In the memory unit 62, unique identification numbers (unique IDs (UID)) for identifying the IC tag 40 are stored, the electronic-apparatus side communication unit 72 can perform communication by identifying each IC tag 40 even when plural IC tags 40 exist in the communication area of the electronic-apparatus side communication unit 72 of the electronic apparatus 10 at the same time. As the method of identifying the IC tag 40, various well-known methods such as a bit-collision method, a time-slot method can be applied.

The control unit 66 controls the IC-tag side communication unit 60 and performs both reading/writing of battery data with respect to the memory unit 62 or only reading thereof.

As the battery data, in addition to the remaining amount data, various data can be cited, which are data of the number of using times indicating the number of times of charging (discharging) the battery device 30, battery identification data allocated uniquely to the battery device 30 and indicating that the battery device 30 is an official product, device type data indicating a device type of the battery uniquely allocated by a manufacturer of the battery device 30, specification data such as the charge capacity, charge current, charge voltage as specifications of the battery device 30.

In other words, there are two kinds of battery data, namely, data which varies according to a period of use (the number of using times) of the battery device 30 such as the remaining amount data and the data of the number of using times, and data which does not vary regardless of the period of use, such as the battery identification data, the device type data and the specification data.

The control unit 66 performs communication with the CPU 54 of the battery control unit 38 through the interfaces 64, 52, which transmits and receives data as well as receives control instructions from the CPU 54. In the embodiment, the control unit 66 obtains remaining amount data, data of the number of using times by performing communication with the CPU 54 of the battery control unit 38.

As methods of supplying power for operating the IC tag 40, for example, the following three methods can be cited.

1. The IC tag 40 is formed as an active tag by incorporating a battery which is different from the battery cell 36 in the IC tag 40 and supplying power from the battery.

2. The IC tag 40 is formed as a passive tag by supplying power as the power for operating the IC tag 40, which is generated by receiving electromagnetic wave (electric wave) from the electronic-apparatus side communication unit 72 of the electronic apparatus 10 by the antenna 58.

3. To supply power from the battery cell 36.

In the electronic apparatus 10, the apparatus-side terminal 20 includes a positive terminal 20A and a negative terminal 20B.

In a state in which the battery device 30 is mounted on the battery mount portion 18, the positive terminal 20A and the negative terminal 20B are connected to the positive terminal 34A and the negative terminal 34B of the battery device 30 respectively.

The electronic apparatus 10 includes a regulator 68, a microcomputer 70 and the electronic-apparatus side communication unit 72 in addition to the display 16.

The regulator 68 settles power supply supplied from the battery device 30 through the positive terminals 34A, 20A to a prescribed voltage and a prescribed current to be supplied to the display 16, the microcomputer 70, the electronic-apparatus side communication unit 72, the imaging device, the recording/playback unit and the like.

The microcomputer 70 includes a CPU, a memory, a peripheral interface which are not shown, controlling respective units of the electronic apparatus 10 including the display 16.

The microcomputer 70 is connected to the electronic-apparatus side communication unit 72, giving and receiving data to and from the electronic-apparatus side communication unit 72 as well as controlling the electronic-apparatus side communication unit 72.

The microcomputer 70 performs display of the remaining amount of the battery device 30 at the display 16 based on the remaining amount data in battery data transmitted from the IC tag 40 of the battery device 30 to the electronic-apparatus side communication unit 72. Specifically, the microcomputer 70 finds operation time during which the electronic apparatus 10 can be operated by calculation based on the battery remaining amount shown by the remaining amount data and power consumption of the electronic apparatus 10, and the operation time is displayed by both or either of a numerical value and an icon (indicator) indicating the operation time.

The electronic-apparatus side communication unit 72 performs wireless communication with the IC tag 40 of the battery device 30, that is, the IC-tag side communication unit 60. A reference numeral 73 in the drawing denotes an antenna provided at the electronic-apparatus side communication unit 72.

The electronic-apparatus side communication unit 72 has a reader/writer function which reads out data from the memory unit 62 of the IC tag 40 by performing wireless communication with the IC tag 40, or which writes data in the memory unit 62 of the IC tag 40.

The wireless communication performed between the electronic-apparatus side communication unit 72 and the IC-tag side communication unit 60 can be performed regardless of whether the battery device 30 is mounted on the electronic apparatus 10 or not.

The wireless communication performed between the electronic-apparatus side communication unit 72 and the IC-tag side communication unit 60 includes reception of the battery data from the IC-tag side communication unit 60.

Next, operation of the electronic apparatus 10 and the battery device 30 of the embodiment will be explained.

Figure 4:
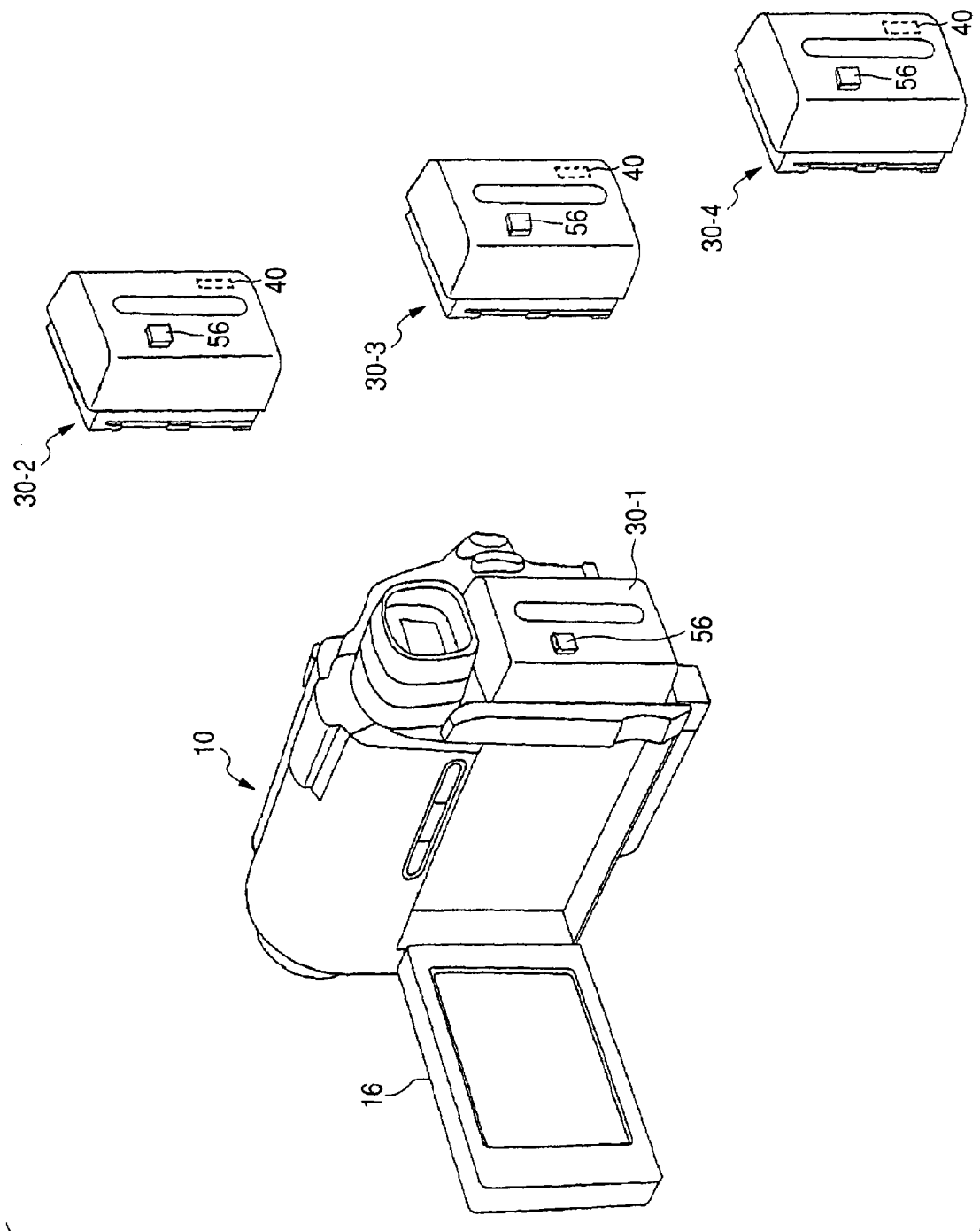
FIG. 4 are perspective views of the electronic apparatus 10 and the plural battery devices 30.
Figure 5:
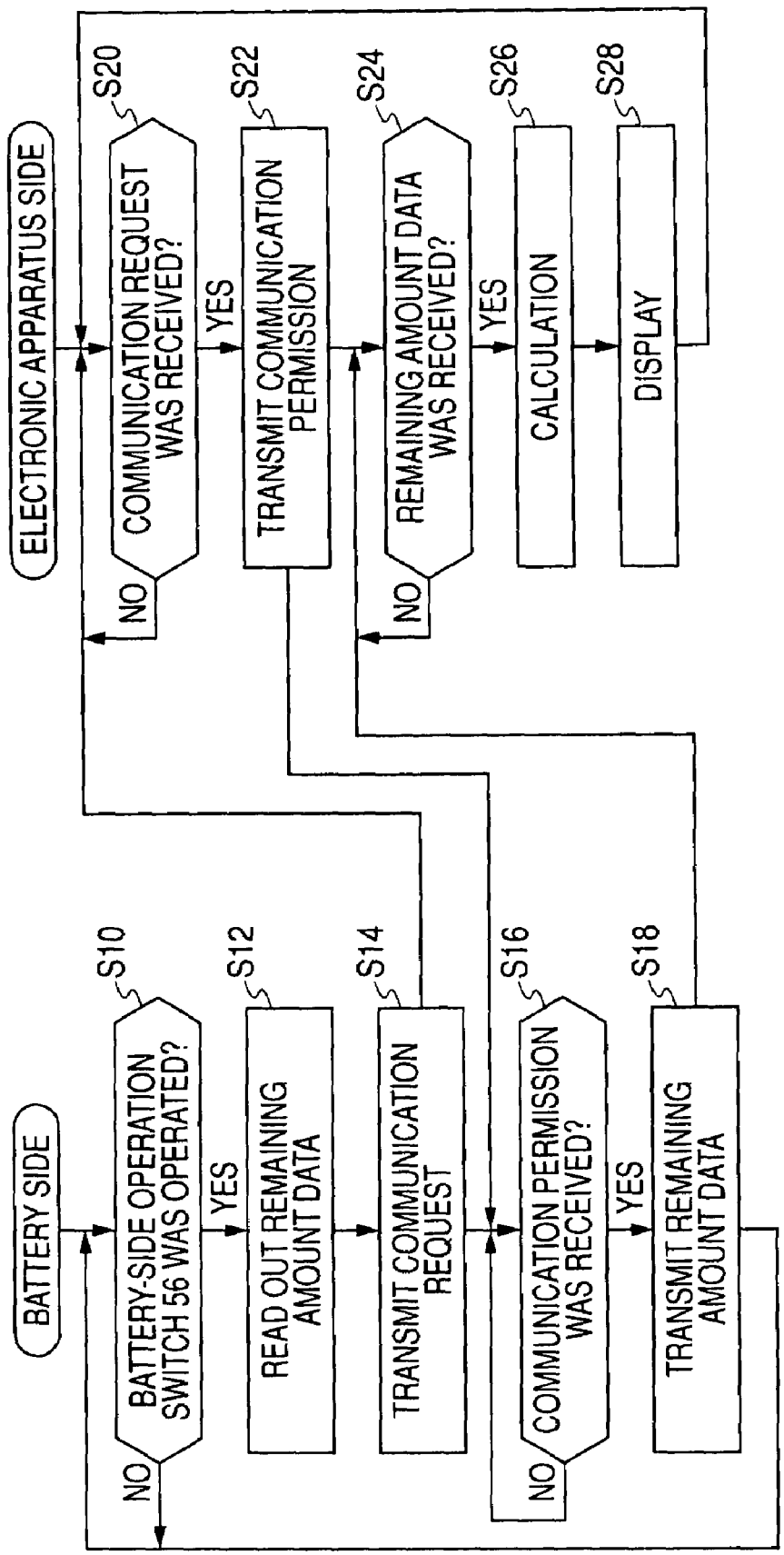
FIG. 5 is a flowchart showing communication operation in the first embodiment.

FIG. 4 are perspective views of the electronic apparatus 10 and plural battery devices 30, and FIG. 5 is a flowchart showing communication operation in the first embodiment.

In the embodiment, for explanatory convenience, the battery device 30 mounted on the electronic apparatus 10 and supplying power to the electronic apparatus 10 is made to be a first battery device 30-1, and auxiliary three battery devices 30 (auxiliary battery devices) which are not mounted on the electronic apparatus 10 and which will be used next are made to be a second, third, and fourth battery device 30-2, 30-3, and 30-4, as shown in FIG. 4.

As shown in FIG. 5, each CPU 54 in the first to fourth battery device 30-1 to 30-4 monitors whether the battery-side operation switch 56 was operated or not (step S10).

For example, when the battery-side operation switch 56 of the second battery device 30-2 which is not mounted on the electronic apparatus 10 is operated, the CPU 54 of the second battery device 30-2 reads out remaining amount data stored in the memory 62 from the IC tag 40 (Step S12). Specifically, when the CPU 54 transmits a command instructing reading of the remaining amount data to the IC tag 40, the control unit 66 in the IC tag 40 reads out the remaining amount data from the memory unit 62.

Next, the CPU 54 transmits a request instruction for starting communication with the electronic apparatus 10 to the IC tag 40, accordingly, the control unit 66 of the IC tag 40 transmits a communication request command to the electronic-apparatus side communication unit 72 through the IC-tag side communication unit 60 (Step S14) and waits for reception of a communication permission command from the electronic-apparatus side communication unit 72 (Step S16).

On the other hand, the electronic-apparatus side communication unit 72 monitors whether a communication request command was received from the IC-tag side communication unit 60 or not (Step S20).

The electronic-apparatus side communication unit 72, when receiving the communication request command (affirmation (Y) in Step S20), transmits a communication permission command to the IC-tag side communication unit 60 if it is possible to start wireless communication (Step S22), and waits for reception of remaining amount data from the IC-tag side communication unit 60 (Step S24).

The control unit 66 in the IC tag 40, when the communication request command from the electronic-apparatus side communication unit 72 is receives by the IC-tag side communication unit 60 (affirmation (Y) at Step S16), transmits the remaining amount data through the IC-tag side communication unit 60 to the electronic-apparatus side communication unit 72 (step S18) and returns to Step S10.

The electronic-apparatus side communication unit 72, when the remaining amount data from the IC-tag side communication unit 60 is received (affirmation (Y) at Step S24), supplies the remaining amount data to the micro computer 70.

The microcomputer 70 performs calculation based on the supplied remaining amount data (step S26) and displays the remaining amount at the display 16 based on the calculated result (step S28).

Then, the process returns to Step S20.

Accordingly, the remaining amount of the second battery device 30-2 whose the battery-side operation switch 56 was operated is displayed at the display 16 of the electronic apparatus 10.

Remaining amounts of the third and fourth battery devices 30-3, 30-4 which are not mounted on the electronic apparatus 10 are also displayed by operating the battery-side operation switch 56 of the battery device 30 in the same way described above.

The remaining amount of the first battery device 30-1 mounted on the electronic apparatus 10 is also displayed by operating the battery-side operation switch 56 of the battery device 30 in the same way described above.

According to the battery device 30 and the electronic apparatus 10 of the embodiment, remaining amount data can be transmitted to the electronic-apparatus side communication unit 72 from the IC-tag side communication unit 60 of the auxiliary battery device 30 which is not mounted on the electronic apparatus 10 and which will be used next by wireless communication, therefore, the remaining amount of the auxiliary battery device 30 which is not mounted on the electronic apparatus 10 and which will be used next at the display 16 of the electronic apparatus 10.

Therefore, data concerning the battery device 30 can be acquired by the electronic apparatus 10 extremely easily without mounting the auxiliary battery device 30 on the electronic apparatus 10, and it is not necessary to attach the battery device 30 to the electronic apparatus 10 each time as in the related arts, as a result, it is advantageous to improve usability.

Particularly, in the embodiment, data concerning the battery device 30 can be acquired by the electronic apparatus 10 extremely easily by a simple operation such that the battery-side operation switch 56 provided at the battery device 30 is operated, as a result, it is more advantageous to improve usability.

Additionally, it is not necessary to provide the display for displaying the remaining amount in the battery device 30, therefore, it is advantageous to increase battery capacity while aiming to reduce the size of the battery device.

In the case that the display for displaying the remaining amount is provided in the battery device 30, the content to be displayed at the display is limited to the simple content because the size and costs of the display are limited, however, the display 16 of the electronic apparatus 10 can be used in the embodiment, therefore, it is advantageous as battery data can be displayed in detail.

In the embodiment, since the IC tag 40 is provided in the battery device 30, it is possible to read battery data and to display the data at a display of a portable electronic apparatus by using the portable electronic apparatus such as a cellular phone which has a function of reading the IC tag, as a result, it is advantageous to increase versatility.

Second Embodiment

Next, a second embodiment will be explained.

In the first embodiment, the battery-side operation switch 56 is provided at the battery device 30, and in the second embodiment, an electronic-apparatus side operation switch 74 is provided at the electronic apparatus 10.

Figure 6:
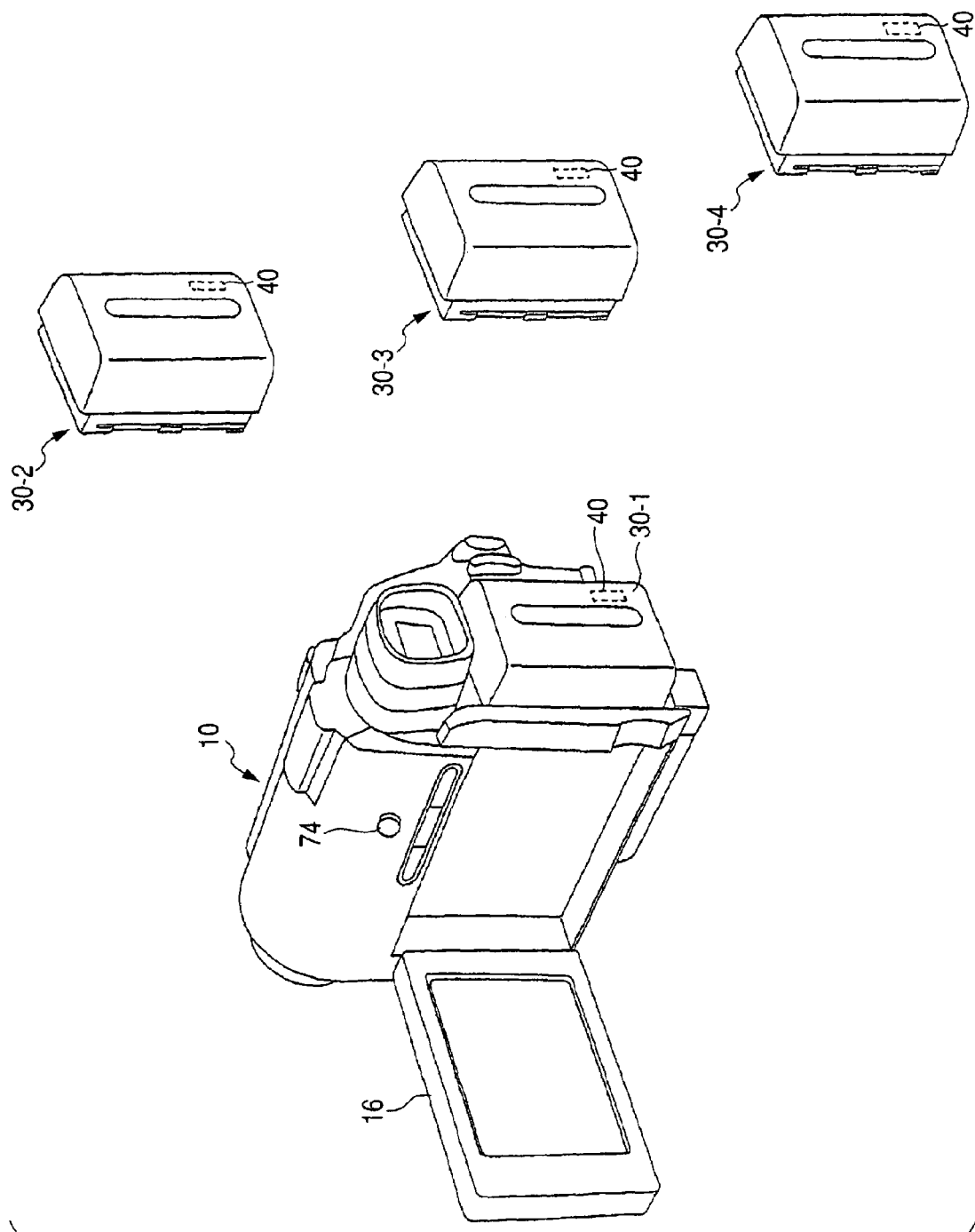
FIG. 6 are perspective views showing the electronic apparatus 10 and plural battery devices 30 in a second embodiment.
Figure 7:
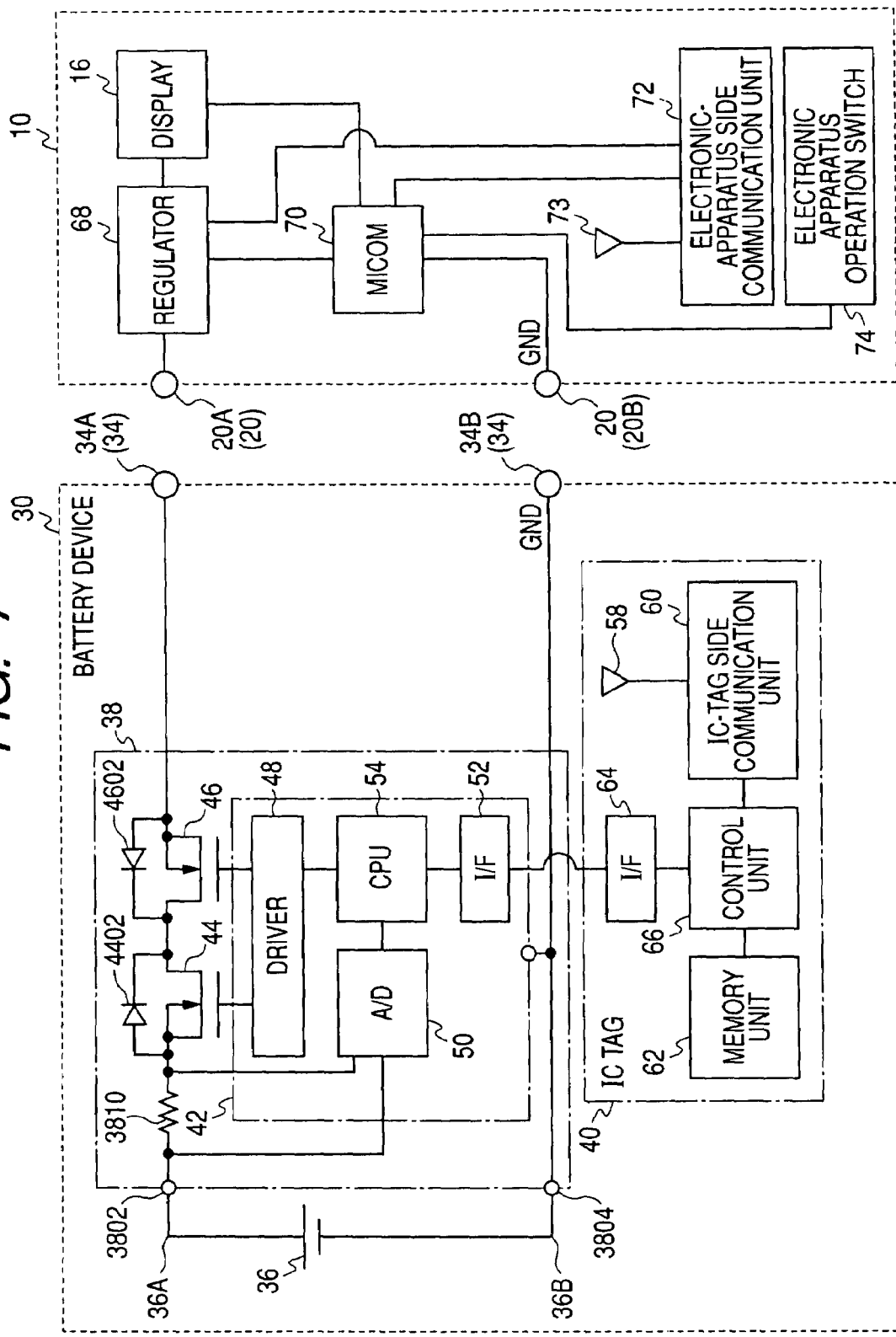
FIG. 7 is a block diagram showing configurations of the electronic apparatus 10 and the battery device 30 in the second embodiment.

FIG. 6 are perspective views of the electronic apparatus 10 and plural battery devices 30 in the second embodiment, and FIG. 7 is a block diagram showing configurations of the electronic apparatus 10 and the battery device 30 in the second embodiment. In the following embodiment, the same or similar points and members as the first embodiment are explained by using the same numerals and signs.

As shown in FIG. 6, the electronic-apparatus side operation switch 74 is provided at the case 12 of the electronic apparatus 10.

As shown in FIG. 7, the microcomputer 70 detects whether the electronic-apparatus side operation switch 74 was operated or not, and instructs the IC tag 40 of the battery device 30 to start communication operation when the switch was operated.

Next, operation of the second embodiment will be explained.

Figure 8:
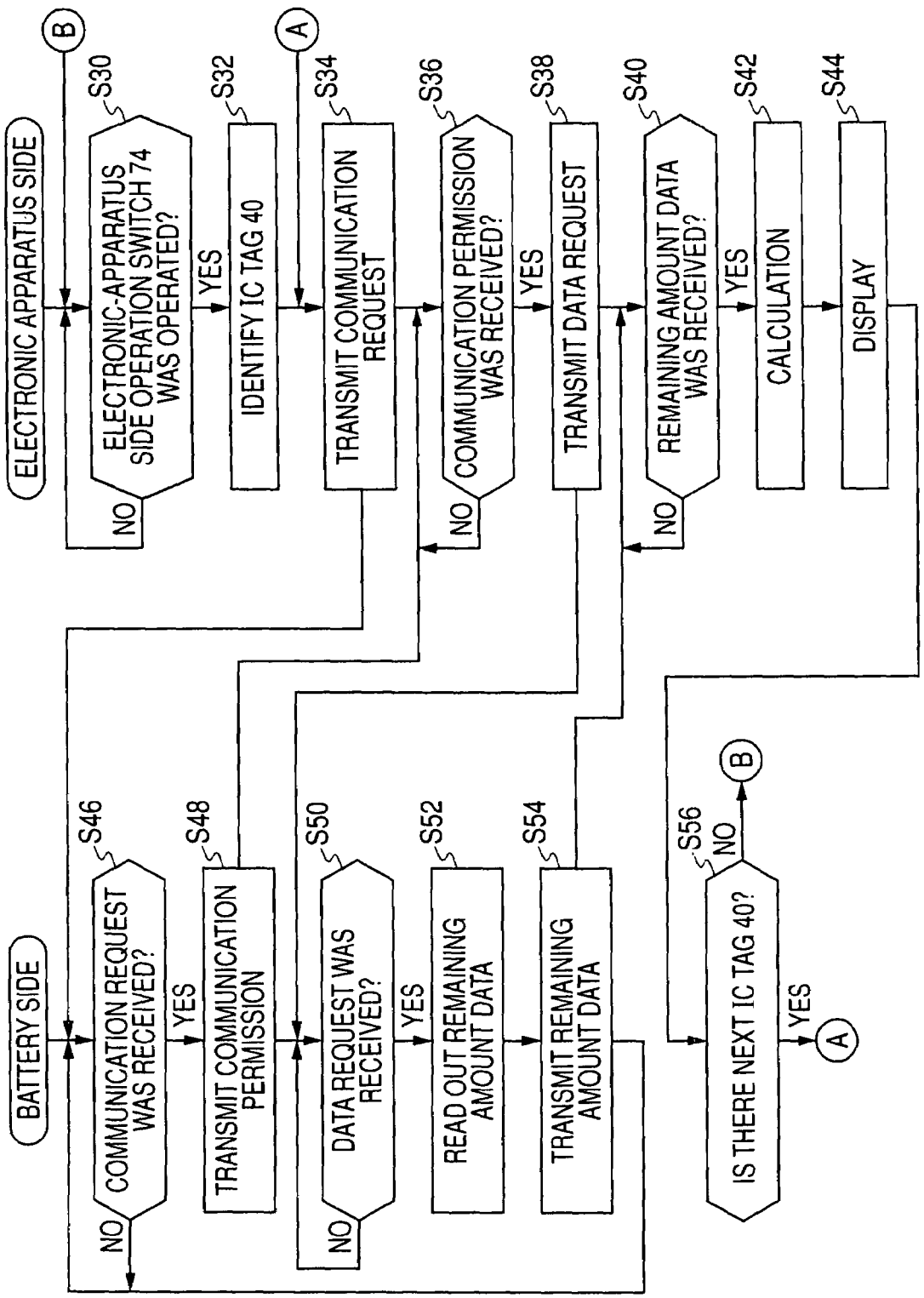
FIG. 8 is a flowchart showing communication operation in the second embodiment.

FIG. 8 is a flowchart showing the communication operation in the second embodiment.

As shown in FIG. 8, the microcomputer 70 of the electronic apparatus 10 monitors whether the electronic-apparatus side operation switch 74 was operated or not (Step S30).

When the electronic-apparatus side operation switch 74 is operated, the microcomputer 70 instructs the electronic-apparatus side communication unit 72 to start communication operation, accordingly, the electronic-apparatus side communication unit 72 performs communication with each IC tag 40 of the first to fourth battery devices 30 positioned in the communication area in which communication is possible, discriminates the identification number unique to each IC tag 40 and recognizes the number of the IC tags 40 (Step S32). In the embodiment, there are four battery devices of the first to fourth devices 30-1 to 30-4, therefore, the electronic-apparatus side communication unit 72 recognizes that there are four IC tags 40.

Next, the electronic-apparatus side communication unit 72 selects one IC tag 40 among plural IC tags 40 and transmits a communication request command to the selected IC tag 40 (Step S34). A method of selecting the IC tag 40 is optional, for example, a method of selecting in ascending order or in descending order of the identification number can be applied.

The electronic-apparatus side communication unit 72 waits for reception of a communication permission command from the IC-tag side communication unit 60 (Step S36).

On the other hand, the IC tag 40 monitors whether the communication request command from the electronic-apparatus side communication unit 72 was received or not (step S46). When the communication request command is received, the IC tag 40 transmits the communication permission command to the electronic-apparatus side communication unit 72 (step S48) and waits for reception of a data request command from the electronic-apparatus side communication unit 72 (Step S50).

The electronic-apparatus side communication unit 72, when receiving the communication permission command from the IC-tag side communication unit 60 (affirmation (Y) in Step S36), transmits the data request command to the IC tag 40 (Step S38) and waits for reception of remaining amount data from the IC-tag side communication unit 60 (Step S40).

The control unit 66 of the IC tag 40, when receiving the data request command from the electronic-apparatus side communication unit 72 (affirmation (Y) at Step S50), reads out remaining amount data from the memory unit 62 (Step S52) and transmits the remaining amount data to the electronic-apparatus side communication unit 72 through the IC-tag side communication unit 60 (Step S54).

The electronic-apparatus side communication unit 72, when receiving the remaining amount data from the IC-tag side communication unit 60 (affirmation (Y) at Step S40), supplies the remaining amount data to the micro computer 70.

The microcomputer 70 performs calculation based on the remaining amount data supplied from the electronic-apparatus side communication unit 72 (Step S42), and displays the remaining amount at the display 16 based on the calculated result (Step S44).

The electronic-apparatus side communication unit 72 judges whether there is an IC tag 40 in which remaining amount data has not been acquired based on the number of IC tags 40 recognized at Step S32 (Step S56), and when there is the IC tag 40 in which remaining amount data has not been acquired, the process proceeds to Step S34 to perform the same processing. When it is judged that there is no IC-tag 40 in which remaining amount data has not been acquired (remaining amount data of all IC-tags 40 has been acquired) in step S56, the process returns to Step S30.

Accordingly, the remaining amounts of the first to fourth battery devices 30-1 to 30-4 are sequentially displayed at the display 16 of the electronic apparatus 10.

In the case of the embodiment, it is necessary to identify that the remaining amount displayed at the display 16 of the electronic apparatus 10 corresponds to which battery device 30 in the four battery devices 30.

Therefore, it is preferable that all or part of identification numbers of the IC tag 40 incorporated in the battery device 30 is displayed as discrimination data at a surface of the case 12 of the battery device 30, and that the discrimination data is displayed at the display 16 with the remaining amount.

As a result, in the battery device 30 and the electronic apparatus 10 in the second embodiment, the same advantages as the first embodiment can be obtained.

In the second embodiment, as is the case with the first embodiment, data concerning the battery device 30 can be acquired extremely easily by the electronic apparatus 10 by the simple operation such that the electronic-apparatus side operation switch 74 provided at the electronic apparatus 10 is operated, therefore, it is more advantageous to improve usability.

Third Embodiment

Next, a third embodiment will be explained.

The third embodiment is a modification example of the second embodiment, in which an operation switch is not used.

Figure 9:
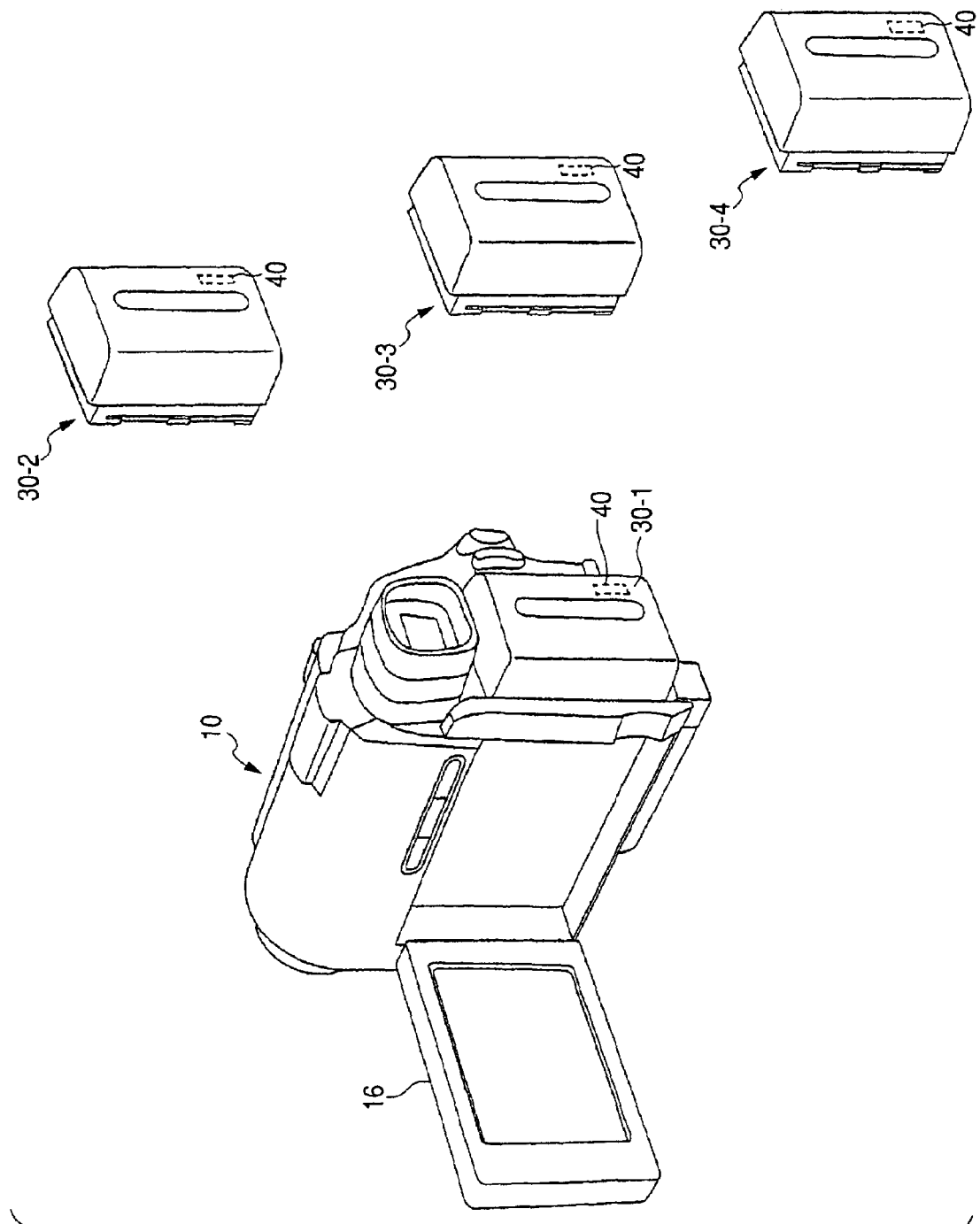
FIG. 9 are perspective views of the electronic apparatus 10 and plural battery devices 30 in a third embodiment.
Figure 10:
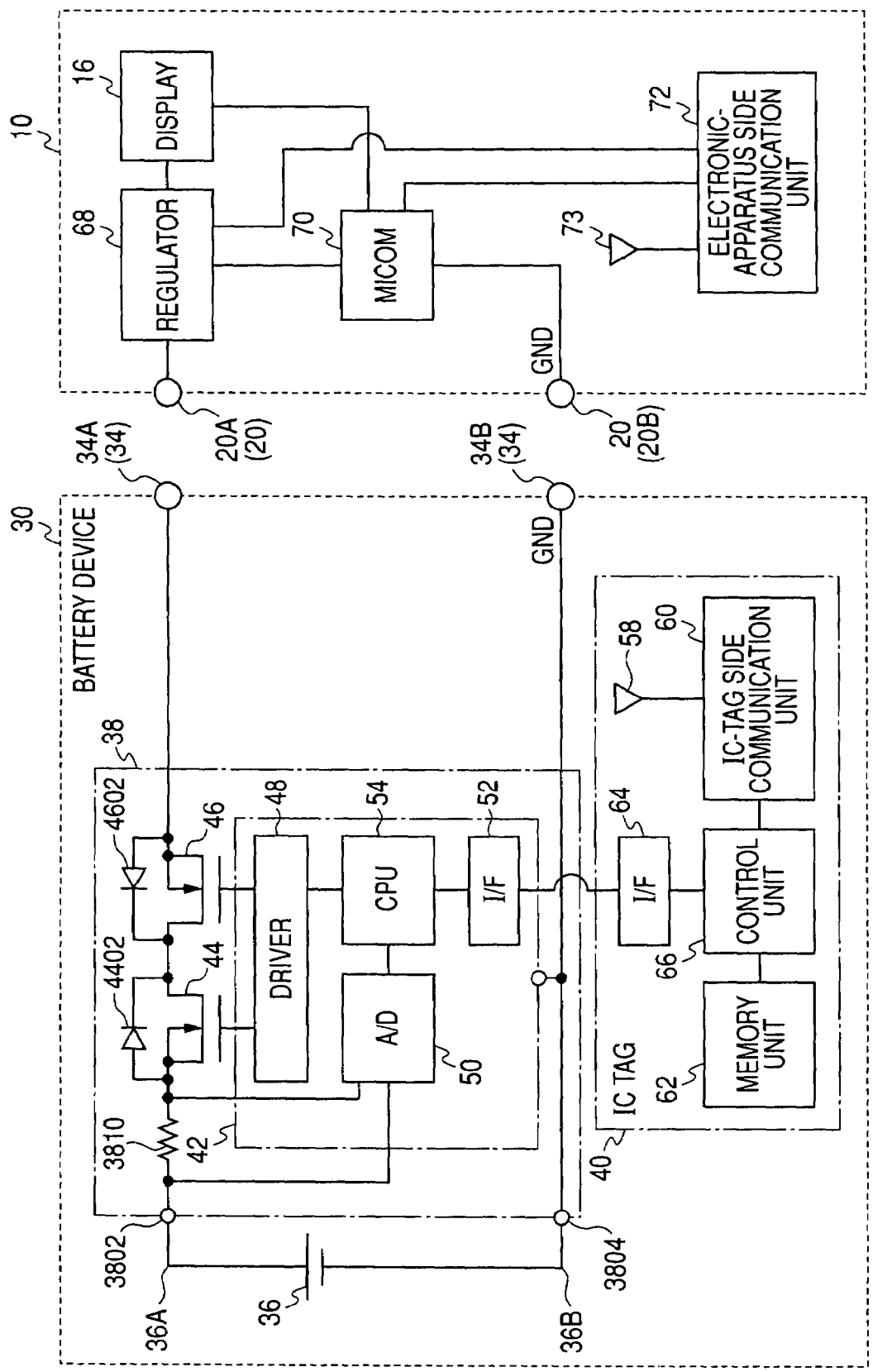
FIG. 10 is a block diagram showing configurations of the electronic apparatus 10 and the battery device 30 in the third embodiment.

FIG. 9 are perspective views showing the electronic apparatus 10 and plural battery devices 30 in the third embodiment, and FIG. 10 is a block diagram showing configurations of the electronic apparatus 10 and the battery device 30 in the third embodiment.

As shown in FIG. 9 and FIG. 10, the operation switch is not provided neither in the battery device 30 nor the electronic apparatus 10.

Figure 11:
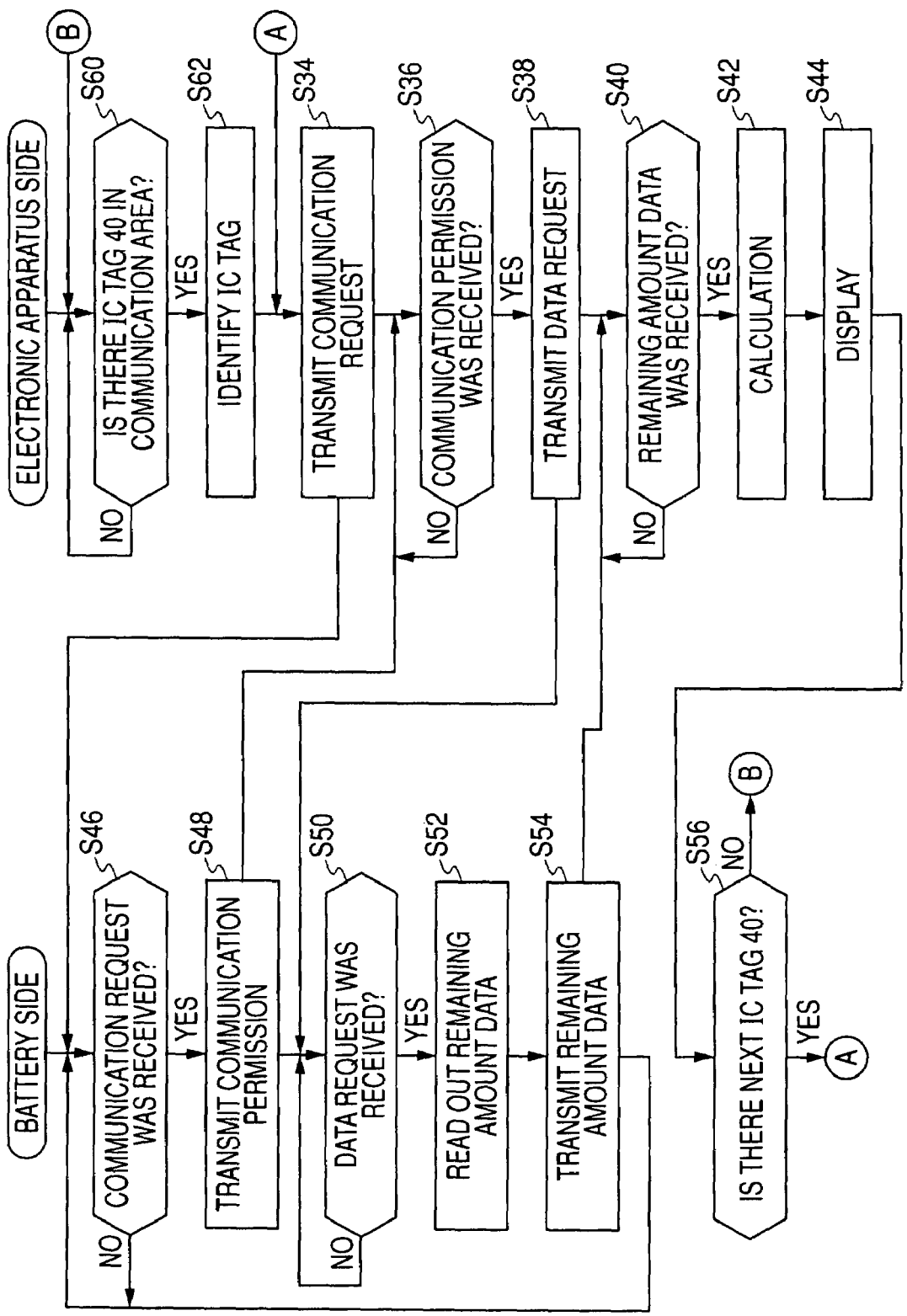
FIG. 11 is a flowchart showing communication operation in the third embodiment.

FIG. 11 is a flowchart showing communication operation in the third embodiment, and the same step numbers are used for the same steps as FIG. 8 showing the second embodiment for explanation.

As shown in FIG. 11, the electronic-apparatus side communication unit 72 of the electronic apparatus 10 monitors whether there is an IC tag 40 in the communication area in which communication with the electronic-apparatus side communication unit 72 is possible or not at each prescribed time (Step S60).

When it is judged that there is the IC tag 40 in the communication area (affirmation (Y) in Step S60), the electronic-apparatus side communication unit 72 communicates with each IC tag 40, discriminates the identification number unique to each IC tag 40 and recognizes the number of IC tags 40 (Step S62).

In the embodiment, since there are four battery devices of the first to fourth battery devices 30-1 to 30-4, the electronic-apparatus side communication unit 72 recognizes that there are four IC tags 40.

That is, in the embodiment, the electronic-apparatus side communication unit 72 forms a detection unit for a battery side communication unit which detects that the IC-tag side communication unit 60 (battery-side communication unit) is positioned in the communication area in which communication with the electronic-apparatus side communication unit 72 is possible.

Next, the electronic-apparatus side communication unit 72 selects one IC tag 40 among plural IC tags 40 and transmits a communication request command to the selected IC tag 40 (step S34).

Since the processing after that is the same as the processing of FIG. 8, explanation will be omitted.

Also in the third embodiment, the same advantages as the first embodiment can be obtained.

Particularly, in the third embodiment, when the battery device 30 in which the remaining amount is to be displayed is closed to the electronic apparatus 10, it is detected that the IC tag 40 (IC-tag side communication unit 60) is positioned in the communication area in which communication with the electronic-apparatus side communication unit 72 is possible, and remaining amount data is transmitted to the electronic-apparatus side communication unit 72 from the IC-tag side communication unit 60 according to the detection operation, therefore, it is not necessary to provide the operation switch neither in the battery device 30 nor in the electronic apparatus 10, as a result, the number of components can be reduced and it is advantageous to reduce costs as compared with the first and second embodiments.

Fourth Embodiment

Next, a fourth embodiment will be explained.

In the fourth embodiment, communication operation by the electronic-apparatus side communication unit 72 is started by setting a flag provided at the IC tag 40 by operation of the battery-side operation switch 56.

Figure 12:
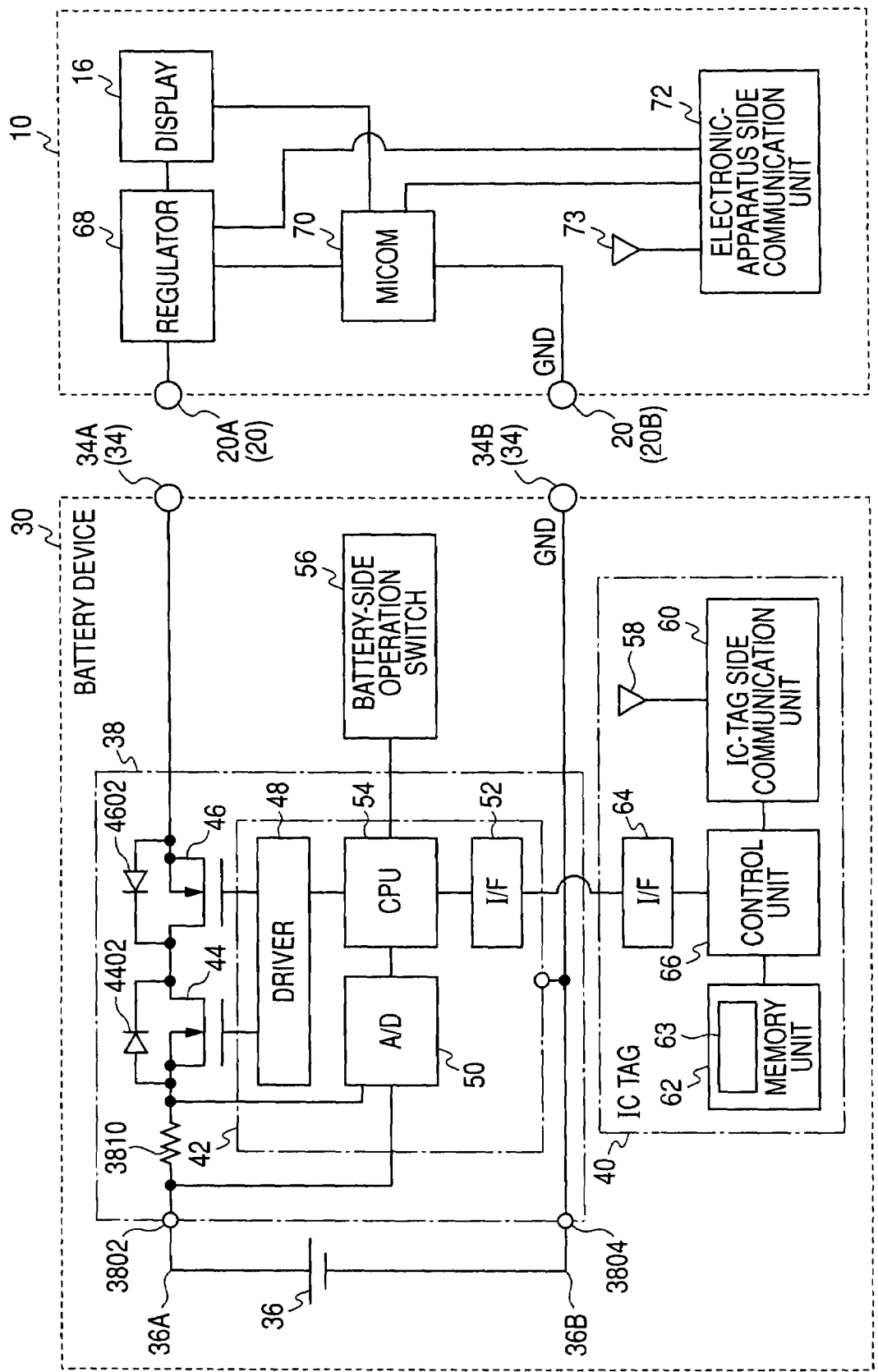
FIG. 12 is a block diagram showing configurations of the electronic apparatus 10 and the battery device 30 in a fourth embodiment.

FIG. 12 is a block diagram showing configurations of the electronic apparatus 10 and the battery device 30 in the fourth embodiment.

As shown in FIG. 12, a priority communication flag 63 which can be read by the electronic-apparatus side communication unit 72 (corresponds to a priority communication storage unit) is provided at the IC tag 40. In the embodiment, the priority communication flag 63 is provided at the memory unit 62.

The CPU 54 gives a command to set the priority communication flag 63 (to set "1") to the control unit 66 according to operation of the battery side operation switch 56.

As described in the second embodiment, the electronic-apparatus side communication unit 72 is capable of identifying plural IC tags 40 respectively which are positioned in the communication area in which communication is possible by the identification numbers allocated to the IC tags 40.

Therefore, when the priority reading flag 63 is set by the operation of the battery-side operation switch 63, in other words, when prescribed data is set at the priority communication storage unit, the electronic-apparatus side communication unit 72 requests communication with respect to the IC tag 40 at which the priority communication flag 63 is set among plural IC tags 40 positioned in the communication area in which communication is possible, as a result, the electronic-apparatus side communication unit 72 can acquire remaining amount data from the IC tag 40.

According to the above fourth embodiment, the same advantages as the first embodiment can be also obtained.

In the embodiment, the priority communication flag 63 is used as the priority communication storage unit, however, it is also preferable to use a register instead of the flag. It is not necessary that the priority communication storage unit is provided at the memory unit 62 and it may be provided in the register of the control unit 66 or a dedicated storage means may be provided.

In the embodiments, the case in which remaining amount data in battery data is transmitted from the battery device 30 to the electronic apparatus 10 has been explained, however, it goes without saying that battery data other than the remaining amount data may be transmitted.

In the embodiments, as the configuration whereby wireless communication is performed with the electronic-apparatus side communication unit 72, the antenna, IC-tag side communication unit, the memory unit and the control unit in the IC tag 40 are used, however, it goes without saying that the configuration not using the IC tag 40 can be applied on condition that wireless communication with the electronic-apparatus side communication unit 72 can be performed. However, it is advantageous to reduce the number of components and to reduce costs when using the IC tag 40.

In the embodiment, the case in which the electronic apparatus is the imaging apparatus has been explained, however, the electronic apparatus is not limited to the imaging apparatus such as a video camera and a digital still camera, and the invention can be widely applied to various electronic apparatuses used with the battery device being mounted thereon.

It should be understood by those skilled in the art that various modifications, combinations, sub-combinations and alterations may occur depending on design requirements and other factors insofar as they are within the scope of the appended claims or the equivalents thereof.

What is claimed is:

1. A battery device comprising:
   a battery cell;
   a case housing the battery cell;
   a battery-side operation switch provided at the case;
   an antenna;
   a battery-side communication unit performing wireless communication through the antenna with respect to an electronic-apparatus side communication unit provided at an electronic apparatus on which the battery device is removably mounted;
   a memory unit storing battery data which is data concerning the battery device; and a control unit performing control of the battery-side communication unit, and both reading/writing of the battery data with respect to the memory unit or only reading thereof, wherein the battery-side communication unit performs wireless communication with the electronic-apparatus side wireless communication unit according to operating the battery-side operation switch in a state in which the battery device is not mounted on the electronic apparatus.

2. The battery device according to claim 1, wherein a battery-side operation switch is provided at the case, wherein a priority communication storage unit is provided at the battery device, which can be read by the electronic-apparatus side communication unit through the battery-side communication unit, wherein the priority communication storage unit sets prescribed data by operation of the battery-side operation switch, and wherein the electronic-apparatus side communication unit judges whether the prescribed data is set in the priority communication storage unit of the battery device or not, and performs wireless communication with the battery-side communication unit when the prescribed data is set.

3. The battery device according to claim 1, further comprising:

a remaining amount detection unit detecting a battery remaining amount of the battery cell and generating remaining amount data, and wherein the battery data includes the remaining amount data.

4. The battery device according to claim 1, further comprising:

an IC tag, and wherein the antenna, the battery-side communication unit, the memory unit and the control unit are provided in the IC tag.

5. An electronic apparatus on which a battery device is removably mounted, comprising:

an electronic-apparatus side communication unit performs wireless communication with a battery-side communication unit provided at the battery device in a state in which the battery device is not mounted on the electronic apparatus, and wherein wireless communication performed between the electronic-apparatus side communication unit and the battery-side communication unit includes reception of battery data which is data concerning the battery device from the battery-side communication unit, wherein the battery-side communication unit performs wireless communication with the electronic-apparatus side wireless communication unit according to operating a battery-side operation switch associated with the battery device in a state in which the battery device is not mounted on the electronic apparatus.

6. The electronic apparatus according to claim 5, wherein the battery data includes remaining amount data indicating a battery remaining amount of the battery device.

7. The electronic apparatus according to claim 5, wherein the battery device includes an IC tag, and wherein the battery-side communication unit is provided at the IC tag.

8. An electronic apparatus on which a battery device is removably mounted, comprising:

an electronic-apparatus side communication unit performing wireless communication with a battery-side communication unit provided at a battery device which will be used next in a state in which the battery device is mounted on the electronic apparatus, and wherein wireless communication performed between the electronic-apparatus side communication unit and the battery-side communication unit includes reception of battery data which is data concerning the battery device which will be used next from the battery-side communication unit, and wherein the electronic-apparatus side communication unit is operable to select one IC tag among a plurality of IC tags each corresponding to one of a plurality of battery devices positioned in a communication area in which communication with the electronic-apparatus side communication unit is possible.

9. The electronic apparatus according to claim 8, wherein the electronic-apparatus side communication unit includes a detection unit for a battery side communication unit detecting that the battery-side communication unit is positioned in a communication area in which communication is possible with the electronic-apparatus side communication unit, and wherein the electronic-apparatus side communication unit performs wireless communication with the battery-side communication unit according to detection operation of the detection unit for the battery-side communication unit.

10. An electronic apparatus on which a battery device is removably mounted, comprising:

an electronic-apparatus side communication unit performing wireless communications with a plurality of battery-side communication units provided at a plurality of respective battery devices used in a state in which the plurality of battery devices are not mounted on the electronic apparatus, and wherein, upon operation of a battery side operation switch corresponding to one battery device among the plurality of battery devices, wireless communication is performed between the electronic-apparatus side communication unit and a battery-side communication unit corresponding to the one battery device, whereby the electronic-apparatus side communication unit receives battery data based on judging whether a remaining amount of data has not been acquired from the battery-side communication unit.

11. An electronic apparatus on which a battery device is removably mounted, comprising:

an electronic-apparatus side communication unit performs wireless communication with a battery-side communication unit provided at the battery device in a state in which the battery device is not mounted on the electronic apparatus, and wherein wireless communication performed between the electronic-apparatus side communication unit and the battery-side communication unit includes reception of battery data which is data concerning the battery device from the battery-side communication unit, wherein an electronic-apparatus side operation switch is provided at the electronic apparatus, and wherein the electronic-apparatus side communication unit performs wireless communication with the battery-side communication unit according to operation of the electronic-apparatus side operation switch.

* * * * *